United States Patent [19]

Christensen

[11] Patent Number: 4,468,829
[45] Date of Patent: Sep. 4, 1984

[54] CLEANING AND DEBURRING TOOL FOR SPENT CARTRIDGE CASES

[76] Inventor: Betty L. Christensen, Box 493, Chandlers Valley, Pa. 16312

[21] Appl. No.: 430,816

[22] Filed: Sep. 30, 1982

[51] Int. Cl.³ .................. A47L 25/00; B23D 75/00
[52] U.S. Cl. ............................. 15/105; 15/104 R; 15/104.04; 15/104.05; 408/211
[58] Field of Search ......... 15/104.03, 104.04, 104.05, 15/104.1 R, 105, 236 R, 104 R; 86/24, 28, 33; 30/125, 300, 310; 7/158, 167, 157, 138; 408/211, 212; 81/438, 439, 177 E

[56] References Cited

U.S. PATENT DOCUMENTS

| 492,640 | 2/1893 | Thompson | 7/158 |
|---|---|---|---|
| 814,020 | 3/1906 | Clifford | 81/439 X |
| 1,955,419 | 4/1934 | Gerard | 7/167 X |
| 2,470,392 | 5/1949 | Gassmann | 408/211 X |
| 3,763,510 | 10/1973 | Graham | 408/211 X |
| 4,056,020 | 11/1977 | Coviello | 81/438 X |
| 4,176,583 | 12/1979 | Lage | 86/24 |
| 4,273,173 | 6/1981 | Smith et al. | 81/438 X |

FOREIGN PATENT DOCUMENTS

| 2518187 | 4/1976 | Fed. Rep. of Germany | 408/211 |
|---|---|---|---|
| 571375 | 1/1976 | Switzerland | 408/211 |

Primary Examiner—Philip R. Coe
Assistant Examiner—Frankie L. Stinson
Attorney, Agent, or Firm—Wayne L. Lovercheck; Charles L. Lovercheck; Dale R. Lovercheck

[57] ABSTRACT

A tool for cleaning and deburring spent cartridge cases by means of a cleaner at a first end of the tool used to clean the primer pocket of carbon and other residue remaining in the pocket is disclosed herein. The other end of the tool is adapted to deburr the bullet end of the cartridge. The deburring tool is adjustable through a range of sizes to accommodate various sized cartridges. The cleaner end of the tool may be provided with different size cleaners to accommodate various sized primer pockets and may be used alternatively to reshape the primer pocket when crimped primers were used.

3 Claims, 5 Drawing Figures

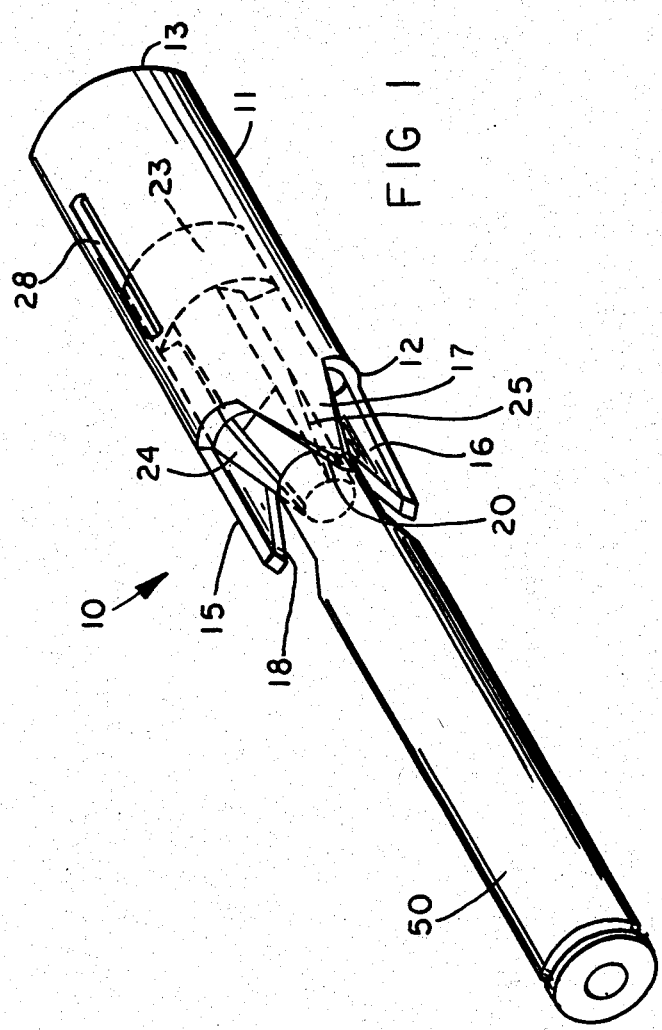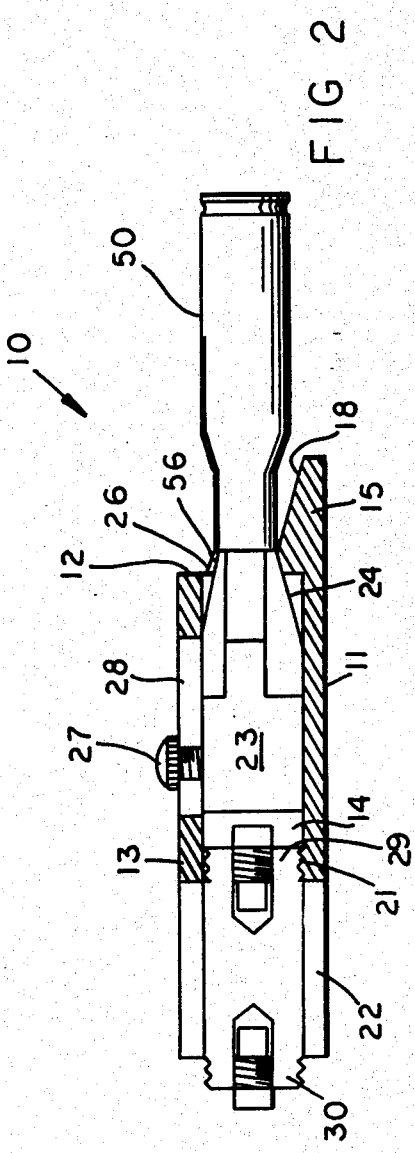

CLEANING AND DEBURRING TOOL FOR SPENT CARTRIDGE CASES

BACKGROUND OF THE INVENTION

1. Field of the Invention:

The invention relates to the handling and refurbishing of cartridge cases and more particularly to a method and apparatus for cleaning and deburring cartridge cases and their primer pockets prior to reloading them with powder for reuse.

2. Description of the Prior Art:

The reloading of rifle and pistol cartridge cases has become popular with sportsmen throughout the world. This is attributable to the economics of reusing cartridge cases which have been fired rather than constantly purchasing new ammunition and discarding the used cartridge cases. Cartridge cases when properly and carefully reloaded may be reused many times. The used cartridge cases have burned residue in the primer pockets and, in instances where crimped primers were used, a misshapen primer pocket which must be reshaped. At the bullet end of the cartridge the open end may be burred and misshapen.

To perform the various operations required to clean and deburr cartridge cases the reloader has been faced with use of a number of tools. The principal objective of the present invention is to provide a simple method and apparatus incorporating a single tool which can be used in conjunction with reloading to quickly and easily clean and deburr cartridge cases.

It is a further object of this invention to provide a tool which will clean primer pockets when crimped primers have previously been used.

It is a further object of the invention to provide a tool which will deburr and clean a variety of sizes of cartridge cases.

SUMMARY OF THE INVENTION

The above objects are achieved in accordance with the present invention by providing a tool in which the principal features comprise a body member having a bore extending axially from one end to the other. At one end of the body member, means adapted to engage the outer surface of the bullet end of a cartridge are provided. An inner member is adapted to move within the axial bore and is provided with locking means such as a thumbscrew to hold it in position. At one end of the inner member, means adapted to engage the inner surface of the bullet end of a cartridge are provided.

BRIEF DESCRIPTION OF THE DRAWINGS

FIG. 1 is an isometric side view of the body member with inner member shown in phantom and a cartridge case in engagement.

FIG. 2 is a cross sectional side view of the body member and holder according to the invention with a cartridge case in engagement.

DESCRIPTION OF THE PREFERRED EMBODIMENTS

Figure 3:
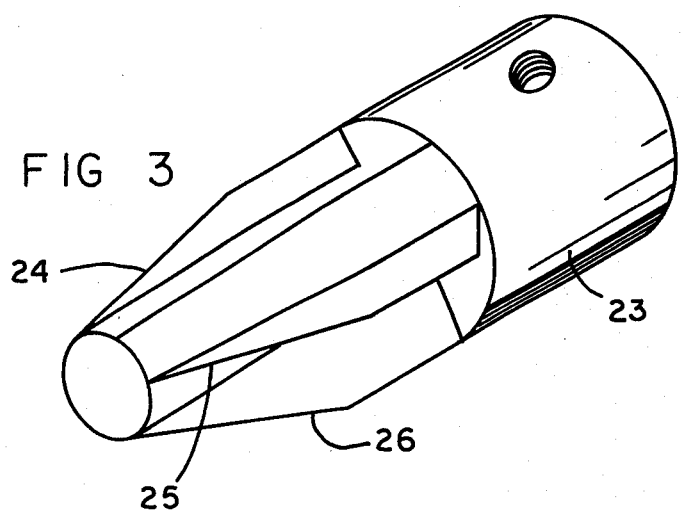
FIG. 3 is an isometric view of the inner member according to the invention.
Figure 4:
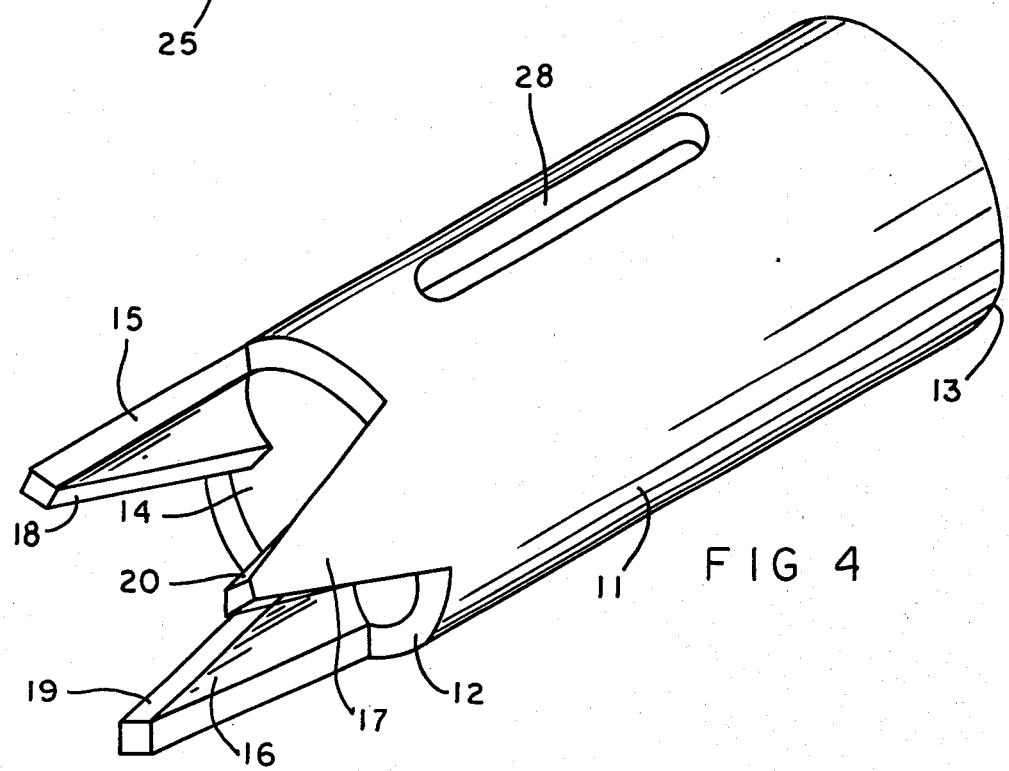
FIG. 4 is an isometric view of the body member according to the invention.
Figure 5:
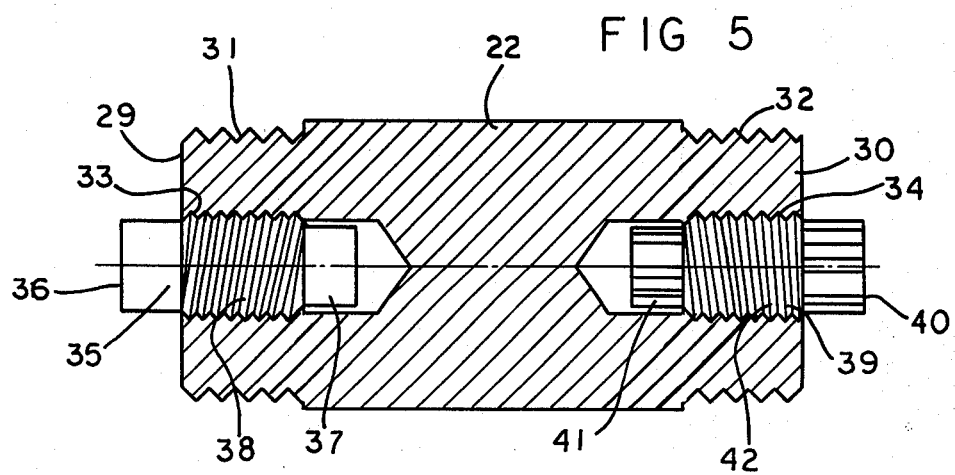
FIG. 5 is a cross sectional side view of the holder according to the invention.

Now, with more particular reference to the drawings, a tool for cleaning and deburring spent cartridge cases is shown generally at 10. The tool 10 has a cleaning half and a deburring half. The deburring half has a body member 11 which may be generally cylindrical in shape and has a first end 12 and a second end 13. The body member has a bore 14 extending axially from the first end to the second end. The first end 12 of the body member is the deburring end and is provided with outer members 15, 16 and 17. The outer members 15, 16 and 17 have engaging surfaces 18, 19 and 20 which are adapted to engage the bullet end of an empty cartridge case and deburr the outer edge as the cartridge is rotated relative to the body member 11. Internal threads 21 are located at the second end 13 of the body member 11 in the bore 14. The internal threads 21 are adapted to engage threads 31 or 32 on a holder 22.

An inner member 23 is supported in the bore 14 of the body member 11 adjacent the first end thereof. The inner member has engaging surfaces 24, 25 and 26 which are adapted to engage the inner surface of the bullet end of a spent cartridge case such that said cartridge case 50 will be deburred when the cartridge case is rotated relative to the body member 11 when the inner member 23 and outer members 15, 16, and 17 are in engagement with the cartridge case 50.

The inner member 23 may be adjustable through a range of positions in the bore 14 in the body member 11. The inner member may be held in position by a thumbscrew 27 which is inserted through a slot 28 in the body member 11. The thumbscrew may be brought into engagement with the inner member 23 to hold it in the desired position relative to the outer members 15, 16 and 17.

The holder 22 for cleaning the primer has a first end 29 having external threads 31 and internal threads 33. The holder has a second end 30 having external threads 32 and internal threads 34. The external threads 31 and 32 are adapted to engage the internal threads 21 of the body member 11. Therefore, the holder may be attached to the body member by either the first end or the second end thereof.

A cleaner 35 is adapted to be supported in the internal threads 33. The cleaner 35 has a first blade 36 which is adapted to clean a primer pocket of a cartridge case 50. The cleaner also has a second blade 37 which is adapted to clean primer pockets of a different size. The cleaner is also provided with a threaded midsection 38 which is adapted to be supported by the internal threads 33 of the holder 22. The cleaner may be supported on the holder with either the blade 36 or the blade 37 in a working position to clean the primer pocket of cartridge cases. Which blade is used depends upon the primer size; for example typical pistol or rifle sizes.

A reamer tool 39 is provided having a first reamer 40 and a second reamer 41 of different sizes adapted to clean primer pockets where crimped primers have been used and the pocket requires reshaping. The reamer tool is provided with a threaded midsection 42 which will permit the reamer tool to be supported in the holder with either the first reamer 40 or the second reamer 41 in a working position to clean and reshape different sized primer pockets. Which reamer is used depends upon the size of the primer pocket; for example they may be of typical pistol and rifle sizes.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A tool for cleaning and deburring spent cartridge cases comprising:
   a body member,
   the body member having a first end and a second end,
   a bore extending axially therebetween,
   an outer deburring means formed in the first end of the body member for deburring the outer periphery of a spent cartridge case, internal threads at the second end of the body member,
   an inner member telescopically supported in the bore of the body member adjacent the first end thereof,
   an axially extending slot in said body member and a screw extending through said slot and threadably engaging said inner member,
   said screw having a head,
   said head engaging the outside of said body member for holding said inner member relative to said outer member,
   the inner member having external deburring means for deburring the inner periphery of a spent cartridge case,
   the deburring means on said inner member and the deburring means on said outer member being adapted to engage a bullet end of a spent cartridge case whereby said cartridge case will be deburred when the tool is rotated about said cartridge case with the inner and outer members in engagement therewith,
   a holder,
   said holder engaging the internal threads at the second end of said body,
   a cleaner supported at a first end of said holder,
   and a reamer tool supported at a second end of said holder.

2. The tool for cleaning and deburring spent cartridge cases as recited in claim 1 wherein the cleaner is threadably supported at the first end of the holder,
   the cleaner having a first blade at a first end,
   a second blade at a second end,
   and being threaded along its midportion whereby the cleaner may be held in the holder with the first blade in working position adapted to work on a first size primer pocket and may be held in the holder with the second blade in working position adapted to work on a second size primer pocket.

3. The tool for cleaning and deburring spent cartridge cases as defined in claim 1 wherein the reamer tool is threadably supported at the second end of the holder,
   the reamer tool having a first reamer at a first end,
   a second reamer at at second end,
   and being threaded along its midportion whereby the reamer tool may be held in the holder with a first reamer in working position adapted to work on a first size primer pocket and may be held in the holder with a second reamer in working position adapted to work on a second size primer pocket.

* * * * *